Patented Feb. 20, 1951

2,542,856

UNITED STATES PATENT OFFICE 2,542,856

N-THIADIAZOLYL-4-IODOBENZENE-SULFONAMIDES

William B. Wright, Jr., Plainfield, and James M. Smith, Jr., North Plainfield, N. J., assignors to American Cyanamid Company, New York, N. Y., a corporation of Maine No Drawing. Application June 24, 1949, Serial No. 101,266

5 Claims. (Cl. 260—302)

This invention relates to novel organic compounds and more particularly to p-iodobenzenesulfonamides, and methods for their preparation.

We have discovered a new class of p-iodobenzenesulfonamides which appears to have therapeutic effect in certain neurotropic diseases. The exact manner of effect is at present unknown. However, we have observed that these compounds possess definite anti-viral properties against certain neurotropic viruses such as equine encephalitis, and strains of S. K. neurotropic virus.

The compounds of our invention are new and have not previously been described. They are characterized by the formula

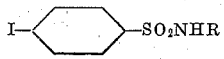

where R is a heterocyclic radical which can be chosen from among the various substituted and unsubstituted heterocyclic radicals such as thiazolyl, pyrimidyl, pyridyl, pyrazyl, pyridazyl, imidazolyl, pyrrolyl, thiadiazolyl, oxazolyl, oxadiazolyl, acridyl, benzothiazolyl, quinoxalyl, pteridyl, etc.

Compounds of this invention can be prepared by several distinct processes. The preferred method utilizes as starting material the various sulfanilamido heterocyclic compounds. The p-amino group is diazotized followed by the decomposition of the diazo compound in the presence of hydriodic acid or a soluble iodide with resultant iodine substitution. An example of this procedure is shown in the specific examples which follow. In general, the diazotization is carried out in the customary manner at temperatures below 25° C., preferably in the range 0–25° C., in 5-20% solution of sulfuric acid using a slight excess of the theoretical amount of sodium nitrite. When the diazotization is complete a solution of a soluble iodide is added and the reaction is allowed to proceed to completion. The preferred iodide is potassium iodide in an aqueous solution of 20-50% concentration. When the reaction has achieved equilibrium, the reaction product is filtered off and recrystallized from suitable solvents. In general, the compounds are white to yellowish solids and are only moderately soluble in water, but more so in alcoholic solutions.

Another distinct method of preparation is by the condensation reaction of a 4-iodobenzenesulfonyl halide with an amino heterocycle in accordance with the following equation:

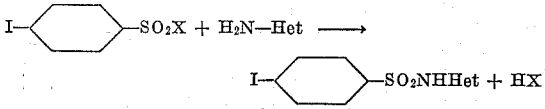

In the above, X is a halogen and Het is a heterocyclic radical such as mentioned above, in which the amino group is attached to a carbon atom in the heterocyclic ring.

A preferred method of effecting the condensation is to bring together the reactants shown in the above equation as 0–100° C. until the condensation is completed. It is preferred that the condensation be conducted with the reactants dissolved or suspended in a tertiary nitrogen base or in an organic solvent containing a basic compound such as sodium carbonate or trimethylamine as acid acceptor, or in an aqueous solution containing a substance which will react with the hydrohalide acid formed during the reaction and prevent it from interfering with the desired reaction equilibrium. One or more mols excess of the tertiary nitrogen base or alkaline substance is desirable. In some cases, substantially the same result can be obtained by the use of an excess quantity of the amino-heterocycle as acid acceptor.

The time of the reaction may vary from a few minutes to several hours depending upon the nature of the reactants, the temperature, the quantity of the batch, and other factors. The details of the particular reactions may be worked out by persons skilled in the art without undue experimentation. The invention will now be illustrated by the preparation of representative compounds in the following examples. All parts are by weight unless otherwise indicated.

EXAMPLE

*N - (1,3,4-thiadiazol-2-yl) - 4-iodobenzenesulfonamide*

To 128 parts of sulfathiadiazole in 3000 parts of water are added 100 parts of concentrated $H_2SO_4$. The reaction is cooled to 2° C. and 500 parts of ice are added. A solution of 35 parts of $NaNO_2$ in 200 parts of water is then added slowly. A solution of 85 parts of potassium iodide in 200 parts of water is added. The reaction is stirred for 5 hours and then allowed to stand overnight. The reaction product is filtered and oven-dried and then repeatedly recrystallized from alcohol-water mixtures. N-(1,3,4-thiadiazol-2-yl)-4-iodobenzenesulfonamide is obtained in light peach-colored needles melting at 248-249° C.

In similar fashion the following iodobenzenesulfonamides may be prepared: N-(2-thiazolyl)-4-iodobenzenesulfonamide; N-(5-carboxy-2-thiazolyl)-4-iodobenzenesulfonamide; N-(4-methyl-2-thiazolyl)-4-iodobenzenesulfonamide; N-(4-phenyl-2-thiazolyl)-4-iodobenzenesulfonamide; N-(4,6-dimethyl-2-pyrimidyl)-4-iodobenzenesulfonamide; N-(4-methyl-2-pyrimidyl)-4-iodobenzenesulfonamide; N-(5-chloro-2-pyrimidyl)-4-iodobenzenesulfonamide; N-(4-methoxy-2-pyrimidyl)-4-iodobenzenesulfonamide; N-(5-methyl-1,3,4-thiadiazolyl-2)-4- iodobenzenesulfonamide; N - (5 - carboxy-1,3,4-thiadiazolyl - 2) - 4 - iodobenzenesulfonamide; N - (5 - phenyl - 1,3,4 - thiadiazolyl - 2) - 4 - iodobenzenesulfonamide; N - (2 - pyridyl) - 4 - iodobenzenesulfonamide; N - (5 - chloro - 2-pyridyl) -4-iodobenzenesulfonamide; N - (2 - quinolyl) -4-iodobenzenesulfonamide; N - (2-imidazolyl) -4-iodobenzenesulfonamide; N-(1-methyl-2-imidazolyl) -4-iodobenzenesulfonamide; N-(2-benzimidazolyl) -4-iodobenzenesulfonamide; N-(4,6 - diamino - 1,3,5 - triazin-2-yl) -4-iodobenzenesulfonamide; N-(4-piperidyl-6-methyl-1,3,5-triazin-2-yl) -4-iodobenzenesulfonamide; N-(2-thiazolinyl) -4-iodobenzenesulfonamide; N - (5-ethyl-4-thiazolon - 2 - yl) - 4-iodobenzenesulfonamide; N-(5-methyl-4-thiazolon-2-yl) -4-iodobenzenesulfonamide; N-(5-methyl - 1,2,4 - oxadiazol-3-yl) -4-iodobenzenesulfonamide; N - (4-methyl - 1,2,5 - oxadiazol - 3-yl) -4-iodobenzenesulfonamide; N - (5 - methyl-1,3,4-oxadiazol-3-yl) -4-iodobenzenesulfonamide; N-(3-phenyl-5-isoxazolyl) - 4 - iodobenzenesulfonamide; N - (3-methyl - 5 - isoxazolyl) - 4 - iodobenzenesulfonamide; N - (4-methyl-5-isoxazolyl) -4-iodobenzenesulfonamide; N-(6-methyl-3-pyridazinyl) -4-iodobenzenesulfonamide; N-(4,5,6-trimethyl-3-pyridazinyl) -4-iodobenzenesulfonamide; N-(2-pyrazinyl) - 4 - iodobenzenesulfonamide; N-(2-quinoxalyl) -4-iodobenzenesulfonamide; N-(5,6-dimethyl - 2 - pyrazinyl) - 4 - iodobenzenesulfonamide.

In view of the unexpected anti-viral properties of these compounds they afford an excellent material for the study of the effect of compounds on viral strains. By using radioactive iodides for the preparation of these iodobenzenesulfonamides and with the use of tracer techniques, it is possible to conduct controlled studies of the metabolism of viral cultures. Such studies, while often made with other organisms including mammals, has never heretofore been attempted with viruses, due to the lack of specific chemotherapeutic agents having apparent metabolic activity against viruses. The preparation of such compounds is envisaged and is included in the scope of this invention.

We claim:
1. N - (1,3,4 - thiadiazol-2-yl) -4-iodobenzenesulfonamide.
2. A method of preparation of compounds of the formula

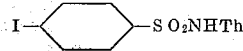

where Th is a thiadiazolyl radical which comprises treating a sulfathiadiazole with sodium nitrite in the presence of sulfuric acid and decomposing the resultant diazo compound in the presence of a soluble iodide to form the above mentioned products.
3. In the method of claim 2 wherein the soluble iodide is potassium iodide.
4. Compounds having the formula:

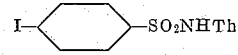

where Th is a thiadiazolyl radical.
5. A method of preparing N-(1,3,4-thiadiazol-2-yl) -4-iodobenzenesulfonamide which comprises treating N-(1,3,4-thiadiazol-2-yl) -4-aminobenzenesulfonamide with sodium nitrite in the presence of sulfuric acid, decomposing the resultant diazo compound in the presence of potassium iodide and recovering said compound therefrom.

WILLIAM B. WRIGHT, JR.
JAMES M. SMITH, JR.

REFERENCES CITED

The following references are of record in the file of this patent:

Richter: Textbook of Organic Chemistry, pp. 510-512 (1938 edition), John Wiley and Sons, New York, N. Y.

Weislogle: Survey of Antimalarial Drugs, vol. 2, part 2, page 1400, J. W. Edwards, Ann Arbor, Michigan (1946).

Beilstein, Handbuch der Organische Chemie, Vierte Auflage, vol. 11, page 65.